United States Patent [19]

Asel

[11] 4,162,885
[45] Jul. 31, 1979

[54] APPARATUS FOR HOT MOLDING OF MATERIAL

[75] Inventor: John R. Asel, Lorraine, Canada

[73] Assignee: Canadian Lady-Canadelle Inc., Montreal, Canada

[21] Appl. No.: 849,368

[22] Filed: Nov. 7, 1977

[51] Int. Cl.² .................................................. B29C 17/03
[52] U.S. Cl. .......................... 425/400; 425/DIG. 48;
  38/102.91; 269/254 CS
[58] Field of Search ............... 269/254 R, 254 CS;
  38/102.1, 102.91; 425/DIG. 48, 361, 416, 398, 400

[56] References Cited

U.S. PATENT DOCUMENTS

| | | | |
|---|---|---|---|
| 2,178,153 | 10/1939 | Walker et al. | 38/102.91 X |
| 2,939,179 | 6/1960 | Penman et al. | 425/398 X |
| 3,156,012 | 11/1964 | Hritz | 425/DIG. 48 |
| 3,167,816 | 2/1965 | Howard et al. | 425/394 X |
| 3,799,728 | 3/1974 | Howard | 425/416 |
| 3,880,561 | 4/1975 | Ferro | 425/398 X |
| 4,043,729 | 8/1977 | Paracchi | 425/398 X |

FOREIGN PATENT DOCUMENTS

| | | | |
|---|---|---|---|
| 1203878 | 1/1960 | France | 425/DIG. 48 |
| 252399 | 10/1948 | Switzerland | 425/DIG. 48 |

Primary Examiner—Robert L. Spicer, Jr.
Attorney, Agent, or Firm—Beveridge, DeGrandi, Kline & Lunsford

[57] ABSTRACT

Apparatus for molding material including a frame for holding the material and which is movable away from the molding die so that the material can be loaded and unloaded into and out of the frame at positions clear of the die. The frame has spring biased movable mountings having pins which penetrate the material and hold this in a resilient manner during molding. A turntable support is provided for holding two of the frames on opposite sides of a vertical axis, and this holds one frame in a convenient loading position while the other frame is holding material being molded.

6 Claims, 5 Drawing Figures

APPARATUS FOR HOT MOLDING OF MATERIAL

The present invention relates to the molding of material, and particularly the hot molding of fabrics formed from synthetic fibers to produce three dimensional articles of apparel, for example molded cups for brassieres.

At present, brassiere cups are made by placing manually a sheet of suitable fabric onto a heated female die part which has two depressions suitably shaped for forming the two cups of a brassiere, using an annular holding member which surrounds the two depressions to hold the edges of the fabric in a yieldable manner, and then bringing down a heated male die part to mold the fabric into the female die part while the material is simultaneously pulled down into the depressions.

This procedure is wasteful of material in that an operator needs to use a fairly large blank sheet of the fabric so that this can be suitably positioned on the female die part, without too much sagging into the depressions of the die part, and without the operator burning his fingers. Another problem with this procedure is that the molded fabric must be removed from the female die while it is still hot, for cooling in a cooling tower, and the fabric is very easily damaged while it is in this hot condition.

The invention provides an apparatus which avoids these problems, and which can be used in other molding situations where it is required to mold a piece of flexible material between heated dies.

In accordance with one aspect of the invention, apparatus for molding material includes a material holding frame movable relative to a forming die so as to be positionable adjacent the die and also removable to a cooling position. The material holding frame has two parts each with an aperture and which are hinged together so as to be movable from a closed position in which the apertures of the two parts are in register and form a common aperture, and in which a piece of material may be held between these parts so as to extend across the common aperture, to an open condition in which material may be loaded and unloaded into and out of the holding frame at a position conveniently spaced from the die. One of the hinged parts has spring biased movable mountings carrying pins which project towards the other of said hinged parts so that in the closed position the pins penetrate and hold material lying between said parts, these mountings allowing the pins to move towards the aperture of the one part against a spring resistance.

A rotatable support may be used, capable of placing one holding frame in position relative to the die while a second holding frame is situated conveniently for loading or unloading. Thus, in accordance with another aspect of the invention, there is provided apparatus for molding of material, including a vertically movable material forming die and a pair of material holding frames movable relative to the die, each of said material holding frames being capable of holding the edge portion of a piece of material while a central portion thereof is molded, said apparatus also including a support for said holding frames rotatable about a vertical axis and also capable of vertical movement, said support having means for locating each of said pair of holding frames in symmetrically spaced apart locating positions on opposite sides of said vertical axis, such that when one holding frame carrying a piece of material is suitably located for molding of material held thereby by said die, the other of said frames is displaced from the die to facilitate removal of molded material therefrom and its replacement by material to be molded.

Where the apparatus is used for the molding of brassiere cups, each of the two parts of the holding frame preferably has two apertures, so that the holding frame will have two common apertures, suitably shaped and positioned for co-operating with the two female and two male die parts.

The invention will be described in more detail with reference to the accompanying drawings, and in which.

Figure 1:
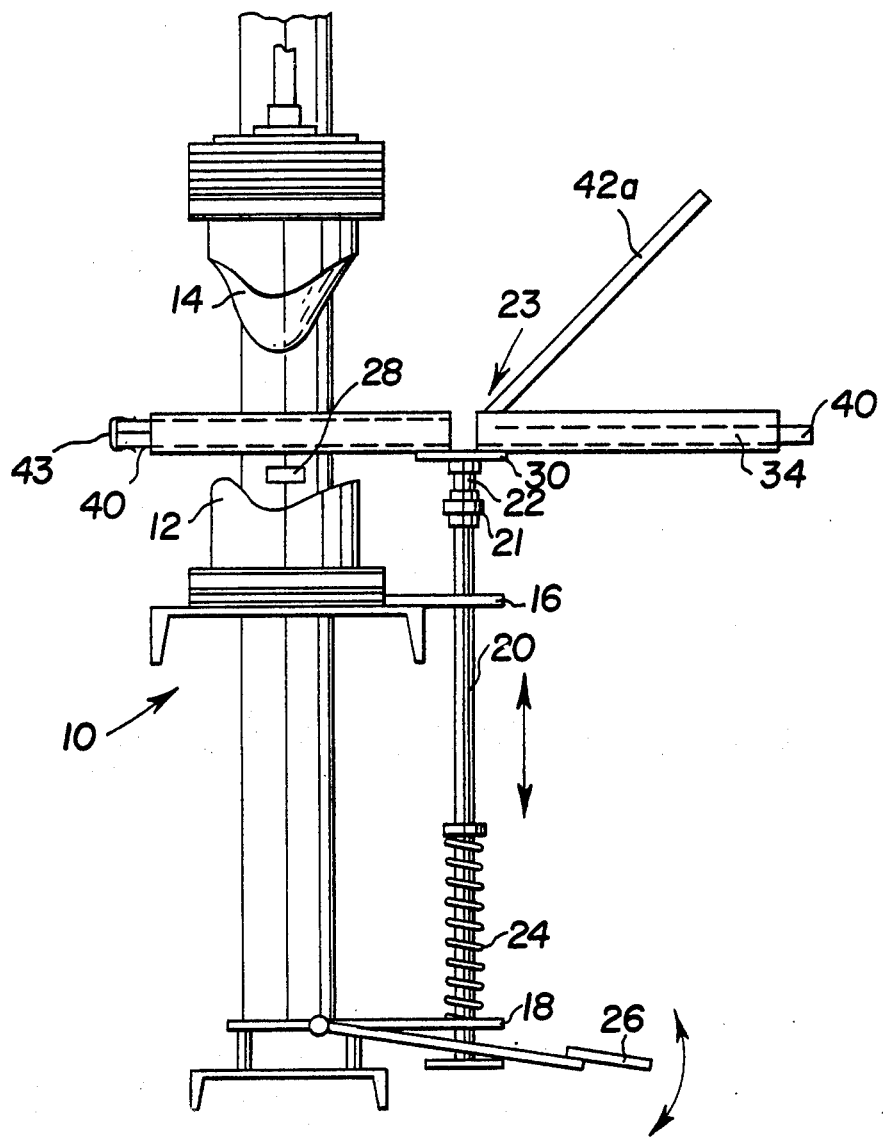
FIG. 1 shows a side elevation of the main parts of the apparatus.

FIG. 1 shows the molding apparatus 10 including a lower stationary die part 12, and a vertically movable upper, male die part 14. Means are provided for heating both of the die parts. The die parts are of known form for molding brassiere cups, the female part 12 having two depressions, and the male die part 14 having two projections or mounds, so that the combined effect of the two die parts is to produce the two molded cups of a single brassiere.

Figure 2:
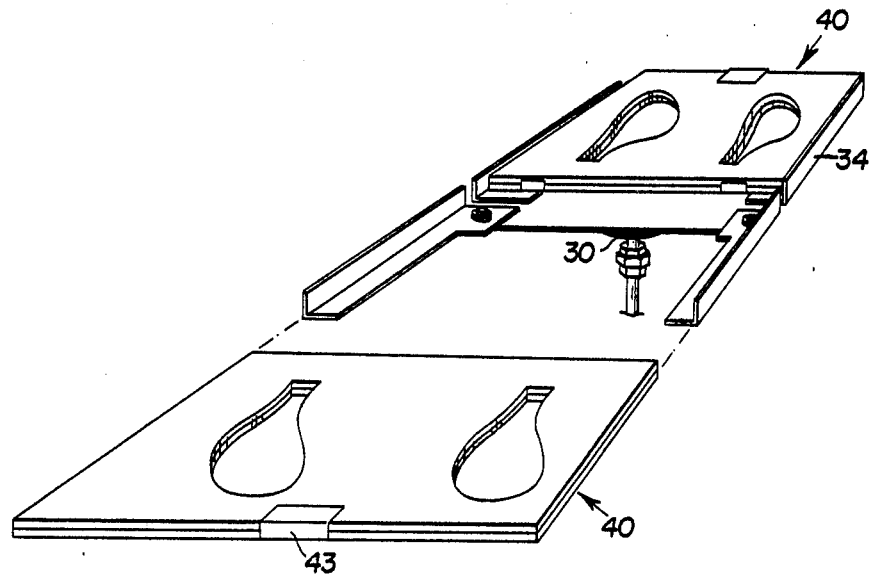
FIG. 2 shows a diagrammatic view of the support for the holding frames, with one frame shown removed.

Held adjacent the molding apparatus 10 by horizontal upper and lower brackets 16 and 18, is a vertically movable shaft 20 carrying at its upper end a bearing 21, which in turn carries a short rotatable spindle 22 carrying a rotatable support 23, which latter item is shown more fully in FIG. 2. The shaft 20 is urged upwards by a compression spring 24 acting between the lower bracket 18 and a stop on the shaft, and the shaft is arranged to be lowered against the spring 24 by a foot pedal 26. When in the lowered position, the support contacts a stop 28 which locates the support so that a frame carried thereby is in the proper molding position.

Support 23 comprises a mounting disk 30 attached to spindle 22, which carries a cross plate 32, which in turn carries four angled members 34 arranged in oppositely extending pairs, with each pair defining a parallel sided recess suitable for receiving the sides of a rectangular frame 40 to be described. The support is symmetrical so that the receiving positions for the frame provided by the support are arranged symmetrically on opposite sides of the axis of shaft 20. Members 34 have elongated slots 35 which allow frames 40 to be adjustably held in the support by screws.

Figure 3:
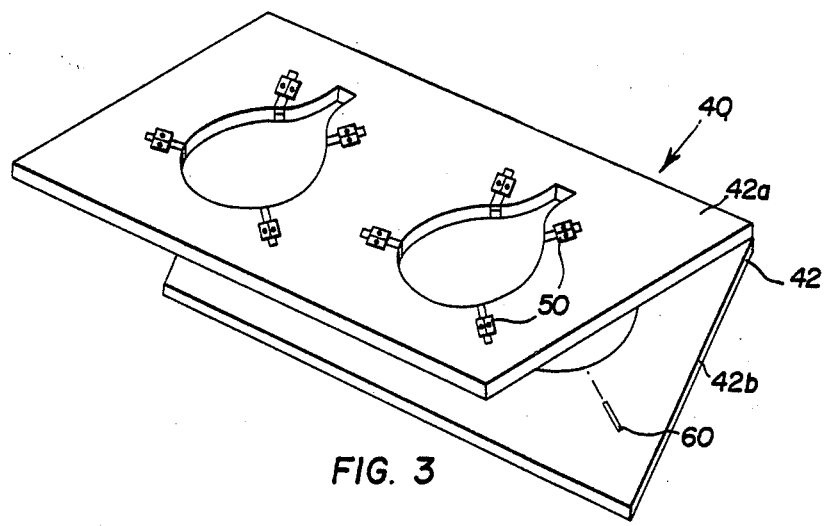
FIG. 3 shows holding frame removed from the support.
Figure 4:
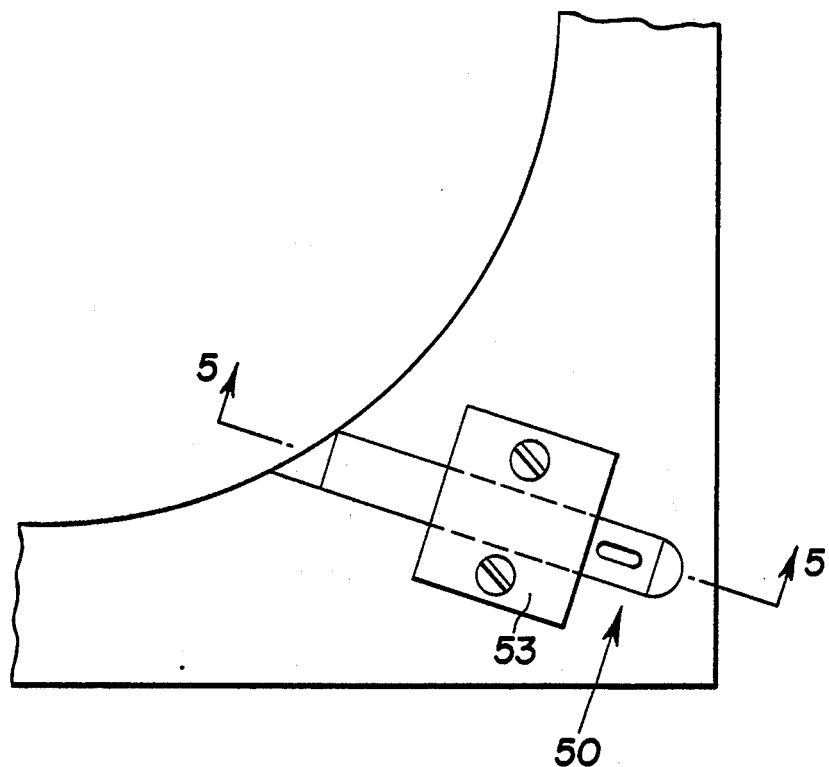
FIG. 4 shows a plan view of an element of the holding frame.
Figure 5:
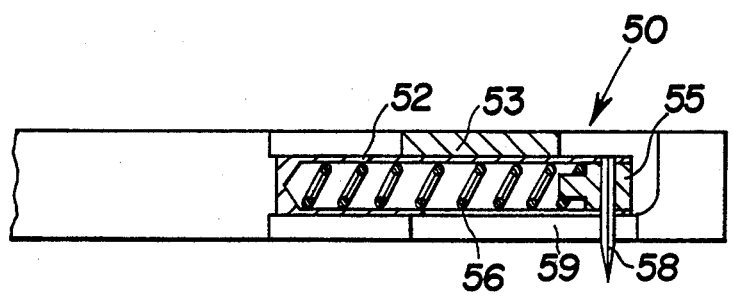
FIG. 5 shows a sectional view of lines 5-5 of FIG. 4.

The frames 40 which provide the holding means for the fabric are shown in detail in FIGS. 3 to 5. Each frame is formed of two similar wood panels 42 hinged together at their longer sides and each having two apertures which are in register when the panels are closed together thus providing the frame with two common apertures each suitably sized and shaped to allow the die parts to act therethrough.

The inwardly facing surfaces of the two panels 42 are substantially flat and smooth and provide some limited, yieldable gripping action on fabric placed between the two panels, when the two panels are held pressed together by a spring clip 43 as shown in FIG. 2. The holding effect of the panels is however largely provided by movable pins held in fixtures 50 which are indicated in FIG. 3 and shown in detail in FIGS. 4 and 5.

The fixtures 50, which are arranged around each of the apertures in the upper panel 42a, each comprise a tube 52 which rests within a groove in the panel, one end of the groove communicating with the aperture in the panel, the tube also lying parallel to the upper and lower surfaces of the panel, The tube is retained in place by a plate 53. The tube carries a movable plunger 55, outwardly spring biased by a spring 56, and the plunger carries a laterally projecting pin 58 which projects through a slot 59 in the bottom surface of the upper panel and also through an ajacent slot in the bottom of the tube 51. The lower panel 42b is provided with grooves which allow free movement of the pin 58 when the two panels are closed together. The arrangement is such that the pins 58 will penetrate the fabric which is sandwiched between the two panels, and while the fabric is being molded by the dies the pins move inwardly towards the apertures against the force of the spring 56. The pins 58 located between the two apertures will move away from each other as they move inwardly toward their respective apertures. Different springs or different spring combinations may be used to give different resistance to movement as required by different fabrics. Also, although not shown, a graduated scale is preferably provided to indicate the amount of movement which occurs in the spring.

In operation, a piece of fabric is placed on the bottom panel 42b of a frame while this is conveniently situated for the operator, i.e. is on the right hand side of FIG. 1. The upper panel 42a is then brought down on the material and held in place by a spring clip 43. The support is manually rotated while in the elevated position shown in FIG. 1, i.e. with the support and frame clear of the lower die 12 and clear of stop 28. When the frame is suitably positioned over die 12, the foot pedal 26 is pressed to allow the material to rest on the lower mold, and the operator locates the support against stop 28. Operation of the mold is then initated, causing the upper die part 14 to descend and mold the material in a preselected time cycle, subsequently rising back to the position shown in FIG. 1. As the die part 14 rises, it allows the support 23 to also rise under the influence of spring 24, foot pedal 26 having been released. Thus, the material is lifted clear of the die parts as soon as they separate so that the amount of heat which the fabric receives is more closely controlled than when manual removal is used. Subsequently, a further piece of material having been positioned in the outer frame of support 23, this support is again rotated through 180°. When molding of this second piece of fabric has commenced, the first piece has cooled sufficiently to allow its removal from the frame.

The invention allows for less wastage of material, since a blank piece of fabric can be accurately positioned in the frame 40 without the operator worrying about burnt fingers. Operation is faster than with the conventional method since the only operations required when the die parts are open is for the support to be rotated through 180°, bringing the next piece of fabric into its operative position. Also, there is no need for an operator to touch the hot fabric, since this can be allowed to cool while still in the frame.

In a modification of the process, the frames may be made readily removable from the support, and more than two frames can be used so that after molding fabrics may be removed from the support, still in the frame, and moved to a cooling tower for more prolonged cooling before being removed from the frame.

The use of spring biased pins is not essential to the invention, and stationary pins may be used, with otherwise similar frames, and the rotatable support, as described.

I claim:

1. Holding means for holding material during forming by a die, comprising two substantially flat parts each with a pair of apertures which are hinged together so as to be movable from a closed condition in which the apertures are in register so forming a common pair of apertures and in which a piece of material may be held between said parts to extend across said common aperture, to an open position in which material may be loaded and unloaded into and out of the holding means, and wherein one of said hinged parts has spring biased movable mountings carrying pins which are surrounded by the substantially flat area of the respective part and project towards the other of said hinged parts so that in the closed position the pins penetrate and hold material which is held substantially flat between said parts, said pins being spaced apart around each of said apertures and being movable towards their respective aperture of the one part against a spring resistance at least some of said pins being located between said apertures and being movable away from each other as they move toward their respective apertures.

2. Apparatus for molding of material, including a material forming die and a material holding frame movable relative to the die, said holding frame having two substantially flat parts each with a pair of apertures which are hinged together so as to be movable from a closed condition in which the apertures of the two parts are in register and form a common pair of apertures and in which a piece of material may be held between said parts so as to extend across said common aperture, to an open condition in which material may be loaded and unloaded into and out of the holding frame, wherein one of said hinged parts has spring biased movable mountings carrying-pins which project towards the other of said hinged parts so that in the closed position the pins penetrate and hold material which is held substantially flat between said parts, said pins being spaced apart around each of said apertures and being located in the substantially flat area of its respective part, said pins being movable toward their respective apertures against a spring resistance, at least some of said pins being located between said apertures and being movable away from each other as they move toward their respective apertures.

3. Apparatus according to claim 2, further comprising means for moving said holding frame from a loading-/unloading position clear of the material forming die, to an operative relationship with the die in which the said common aperture, and the die position, are such as to allow the die to shape a portion of the material extending across the common aperture.

4. Apparatus according to claim 2, wherein said forming die is movable vertically, and wherein said means for moving the holding frame comprises a support rotatable on a vertical axis and also capable of vertical movement, said support having means for locating two of said holding frames spaced apart on opposite sides of said vertical axis, such that when one holding frame is suitably located for molding of material held thereby by said die, the other of said frames is displaced from the die to facilitate removal of molded material therefrom and its replacement by material to be molded.

5. Apparatus for molding of material, including a material forming die and a material holding frame movable relative to the die, said holding frame having two substantially flat parts each with an aperture and which are hinged together so as to be movable from a closed condition in which the apertures of the two parts are in register and form a common aperture and in which a piece of material may be held between said parts so as to extend across said common aperture, to an open condition in which material may be loaded and unloaded into and out of the holding frame, wherein one of said hinged parts has spring biased movable mountings carrying-pins which project towards the other of said hinged parts so that in the closed position the pins penetrate and hold material which is held substantially flat between said parts, said pins being surrounded by the substantially flat area of the respective part and being movable towards the aperture of the one part against a spring resistance.

6. Apparatus according to claim 5, wherein said forming die is movable vertically, and wherein said means for moving the holding frame comprises a support rotatable on a vertical axis and also capable of vertical movement, said support having means for locating two of said holding frames spaced apart on opposite sides of said vertical axis, such that when one holding frame is suitably located for molding of material held thereby by said die, the other of said frames is displaced from the die to facilitate removal of molded material therefrom and its replacement by material to be molded.

* * * * *